April 21, 1953    K. M. FEIERTAG    2,635,723
PERMANENT MAGNET CLUTCH-BRAKE
Filed Oct. 11, 1950

Inventor:
Karl M. Feiertag,
by Ernest I. Britton
His Attorney.

Patented Apr. 21, 1953

2,635,723

UNITED STATES PATENT OFFICE 2,635,723

PERMANENT MAGNET CLUTCH-BRAKE

Karl M. Feiertag, Fort Wayne, Ind., assignor to General Electric Company, a corporation of New York Application October 11, 1950, Serial No. 189,649

6 Claims. (Cl. 192—12)

This invention relates to clutch and brake mechanisms and more particularly to such mechanisms of the magnetic fluid type combined in a unitary structure.

Magnetic devices, such as clutches, brakes, and dynamometers, have been constructed utilizing a magnetic fluid, such as iron powder in oil, arranged in the air gap. This magnetic fluid solidifies under the influence of magnetic flux traversing the air gap and thus provides the driving connection between two relatively rotatable members of the device. A device of this type is disclosed in my application Serial No. 165,628 entitled Clutch-Brake Mechanism, filed June 2, 1950, Patent No. 2,612,248, issued September 30, 1952, and assigned to the same assignee as this application. It has been found, however, that there is a need for such a device which will clutch or declutch a shaft and simultaneously release or apply a brake to the driven member without the use of an external source of electrical energy. The device proposed in the subject application meets these requirements.

An object of this invention is to provide an improved clutch-brake mechanism of the magnetic fluid type.

Another object of this invention is to provide an improved clutch-brake mechanism of the magnetic fluid type combined to form a unitary structure and requiring no outside source of electrical energy.

A further object of this invention is to provide a combined clutch and brake mechanism of the magnetic fluid type wherein a magnetic shunt is used to control the coupling of the driven member to both the driving member and the brake member.

Further objects and advantages of this invention will become apparent and this invention will be better understood from the following description referring to the accompanying drawing, and the features of novelty which characterize this invention will be pointed out with particularity in the claims annexed to and forming part of this specification.

Figure 1:
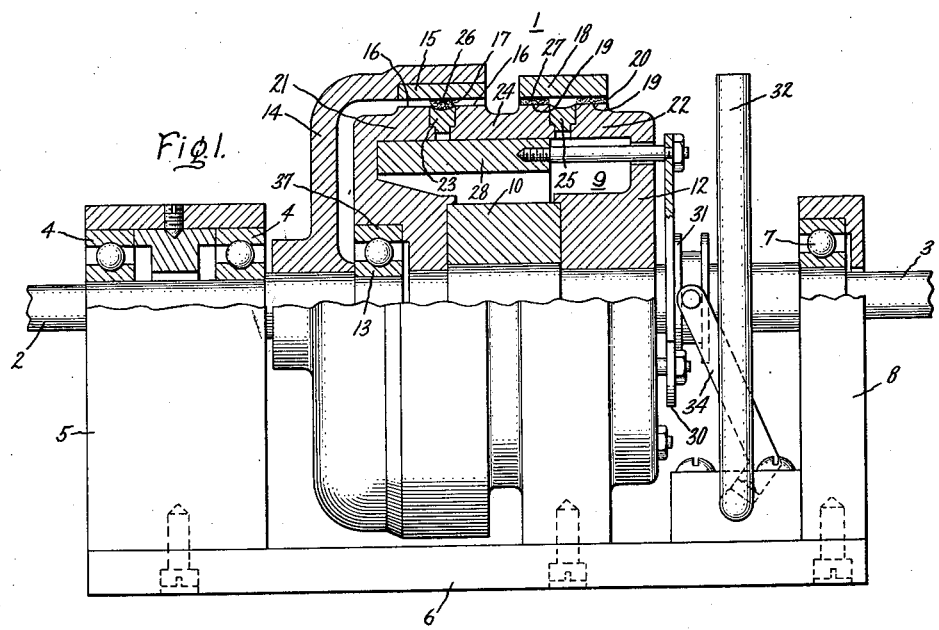
Figure 2:
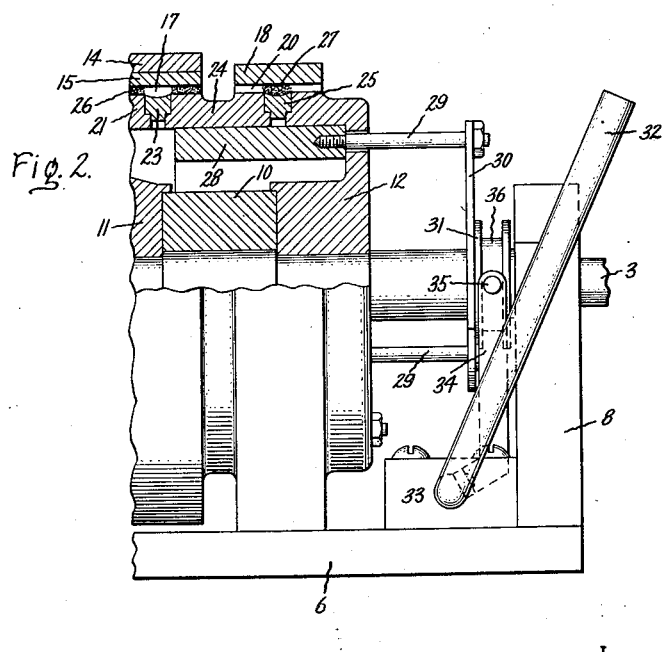

In the drawing, Fig. 1 is a side elevational view, partly in section, of a combined clutch and brake mechanism of the magnetic fluid type, which is provided with an embodiment of this invention, showing the position of the magnetic shunt when the driven member is coupled to the brake element; and Fig. 2 is a fragmentary elevational view, partly in section, showing the position of the magnetic shunt when the driven element is coupled to the driving element.

In accordance with this invention, there is provided a clutch having a driving member and a driven member defining an air gap therebetween. There is also provided a stationary brake member which defines a second air gap with the driven member. A permanent magnet associated with the driven member produces a unidirectional flux traversing the two air gaps. A magnetically susceptible mixture is arranged in both air gaps and is adapted to be solidified by the flux to provide a driving connection between the respective members. There is further provided a magnetic shunt which serves as a path of low reluctance through which the flux by-passes one of said air gaps. This shunt is movable so that it can be positioned to serve as a bypass for the flux around either air gap. Thus the driven member may be connected to the driving member or the brake depending upon the position of the magnetic shunt.

Referring now to the drawing, there is shown a combined clutch-brake mechanism 1 having a driving shaft 2 and a driven shaft 3. The driving shaft 2 is journaled in suitable bearings 4 arranged in the pedestal 5 of the supporting structure 6. The driven shaft 3 is similarly supported in suitable bearing 7 positioned in pedestal 8 of the supporting structure. A cylindrical armature member, indicated generally at 9, is secured to driven shaft 3. Armature member 9 carries a permanent magnet 10 which is axially polarized and annular in form. Pole pieces 11 and 12 are provided at the polar extremities of permanent magnet 10 and are made of magnetic material. Pole piece 11 is provided with an annular cavity 37 which serves as a seat for bearing 13. Bearing 13 supports shaft 3 rotatively with respect to shaft 2. Shaft 3 may either be made of a nonmagnetic material or be covered with a nonmagnetic sleeve so that it does not provide a leakage path for the flux of magnet 10. Secured to driving shaft 2 is a nonmagnetic bell-shaped member 14 which partially overhangs armature 9. A ring of magnetic material 15, encased in bell-shaped member 14, concentrically envelops and is separated from the cylindrical surfaces 16 of armature 9, by air gap 17.

A second ring of magnetic material 18, which is secured to the frame 6, similarly concentrically envelops and is separated from the cylindrical surfaces 19 of armature 9 by air gap 20.

A magnetic circuit is thus provided for permanent magnet 10 comprising pole piece 11 which is bell-shaped and partially overlies permanent magnet 10. Pole piece 11 terminates in enlarged portion 21 so as to provide a cylindrical peripheral surface 16. Pole piece 12 is likewise bell-shaped and terminates in enlarged portion 22 so as to provide a peripheral cylindrical surface 19. Enlarged portions 21 and 22 are axially aligned but spaced apart. Positioned between enlarged portions 21 and 22 are nonmagnetic spacer rings 23 and 25 which are separated by magnetic ring 24. Nonmagnetic spacer rings 23 and 25 provide interruptions in the magnetic circuit of permanent magnet 10. Magnetic flux may pass between enlarged portion 21 of pole piece 11 and magnetic ring 24 by passing through magnetic ring 15. In doing this the flux crosses and recrosses air gap 17 where it solidifies the magnetic susceptible mixture 26 in air gap 17 causing the coupling of driving member 14 and driven armature 9. The magnetic flux may likewise pass between magnetic ring 24 and enlarged portion 22 of pole piece 12 by passing through stationary magnetic ring 18. In doing this the flux crosses and recrosses air gap 20 where it solidifies the magnetically susceptible mixture 27 located in gap 20 causing the coupling of driven armature 9 to stationary ring 18.

A magnetic shunt ring 28 is arranged to slide axially within the inner bores of pole pieces 11 and 12. Shunt ring 28 is formed of magnetic material and is adapted to provide a flux path of low reluctance around either nonmagnetic spacer ring 23 or nonmagnetic spacer ring 25. In the position of ring 28 shown in Fig. 1, ring 28 is effective to cause substantially all the magnetic flux to bypass air gap 17. Hence the flux does not cross and recross gap 17 to thereby solidify magnetically susceptible mixture 26. Therefore, with ring 28 in the position shown in Fig. 1, there is no coupling between armature 9 and driving member 14. However, since the magnetic flux must pass through ring 18 it soldifies mixture 27 in gap 20 causing said mixture to couple driven armature 9 to stationary ring 18.

With ring 28 in position shown in Fig. 2, however, driven armature 9 is coupled to driving member 14 and there is no coupling effect between armature 9 and stationary ring 18. Ring 28 provides a path of low reluctance around nonmagnetic spacer ring 25 which causes substantially all flux to bypass air gap 20. However, all the flux must now pass through magnetic ring 15 of the driving member 14 and is effective to cause mixture 26 to couple driven armature 9 to driving member 14.

For adjusting ring 28 to the desired position, there is provided a plurality of rods 29 secured to ring 28 by threading them in equally spaced holes in ring 28. These rods 29 extend axially through holes in pole piece 12 of driven armature 9. The outer ends of rods 29 are secured to spider 30 which is in turn secured to sliding clutch collar 31. The hand lever 32 is pivotally supported in block 33 on supporting structure 6. Lever 32 is provided with an upwardly extending arm 34 which is provided with pins 35 which engage circumferential groove 36 in sliding clutch collar 31. It is obvious that the position of ring 28 may be controlled by lever 32. A clutch has been constructed in accordance with the foregoing description and Figs. 1 and 2 of the drawing and it has been found that the magnetic mixture showed no tendency to leave the idle gap even though no seals were provided. This is apparently due to two facts, the first being that the iron-oil mixture has a phase between the degree of magnetization at which it begins to evidence a dragging effect, and total demagnetization when the mixture becomes entirely fluid and must, therefore, be confined. This intermediate phase is brought about by the introduction of just enough magnetic flux to cause the mixture to coalesce. In this condition, the mixture assumes the character of a light grease even to the point of having limited lubricating qualities. The withdrawal of flux from the gaps 16 or 19, as the case may be, depending upon the position of the shunt ring 28, is never quite complete and there is, therefore, always a sufficient amount of leakage flux passing through the idle gap to cause the iron-oil mixture therein to pass into its intermediate phase thus obviating the necessity for seals.

Furthermore, even if the magnetic flux of the permanent magnet 10 were entirely shunted away from either the gap 16 or the gap 19 by the shunt ring 28, a condition which, as indicated above, is virtually impossible to achieve, some residual magnetism will remain in either the ring 15 or the structure 18 as the case may be, this residual magnetism acting to hold the iron-oil mixture against its inner periphery and thereby preventing its loss. In the sample clutch constructed which operated at speeds up to 1700 R. P. M. and transmitted power up to ½ hp., common cold rolled steel was utilized for the ring 15 and structure 18 and was found to hold sufficient residual magnetism to prevent leakage of the iron-oil mixture. For higher ratings, it may be desirable to utilize a more retentive material such as a cobalt iron alloy.

It will now be readily apparent that this invention provides an improved device adapted for use as a clutch-brake mechanism and utilizing a magnetic mixture in the air gap. It is likewise readily apparent that no outside source of electrical energy is necessary for the operation of this device.

While there is illustrated and described a particular embodiment of this invention, further modifications and improvements thereof will occur to those skilled in the art. It is to be understood, therefore, that this invention is not limited to the specific embodiment shown, and it is intended in the appended claims to cover all modifications which do not depart from the spirit and scope of this invention.

What I claim as new and desire to secure by Letters Patent of the United States is:

1. A magnetic fluid clutch-brake including a driven member, a brake member adjacent said driven member and separated therefrom by a first gap, a driving member adjacent said driven member and separated therefrom by a second gap, said gaps containing a magnetically susceptible mixture, said driven member comprising magnet means arranged to create a magnetic field in said gaps, and shunt means for preventing said magnetic field from being created in one of said gaps.

2. A magnetic fluid clutch-brake including a driven member, a brake member adjacent said driven member and separated therefrom by a first gap, a driving member adjacent said driven member and separated therefrom by a second gap, said gaps containing a magnetically susceptible mixture, said driven member comprising magnet means arranged to create a magnetic field in said gaps, shunt means for causing said magnetic field to bypass one of said gaps, and means for shifting said shunt means so as to cause said magnetic field to bypass the other of said gaps.

3. A magnetic fluid clutch-brake including a driven member, a brake member adjacent said driven member and separated therefrom by a first gap, a driving member adjacent said driven member and separated therefrom by a second gap, said gaps containing a magnetically susceptible mixture, said driven member comprising an axially polarized permanent magnet for creating a magnetic field in each of said gaps, a magnetic shunt adapted to provide a flux path whereby said magnetic field bypasses one of said gaps, and means to shift said magnetic shunt to cause said magnetic shunt to provide a flux path bypassing the other of said gaps.

4. A magnetic fluid clutch-brake including a driving member, a driven member, and a brake member; said driven member comprising a permanent magnet, magnetic pole pieces for said magnet to provide a flux path for the magnetic field created by said magnet, said pole pieces including nonmagnetic spacers to provide interruptions in said flux path, said driving member having a magnetic portion in closely spaced relationship with one of said spacers and forming a gap therewith, said brake member having a magnetic portion in closely spaced relationship with a second of said spacers and forming a second gap therewith, the magnetic portions of said driving member and said brake member serving to complete said flux path, a magnetically susceptible mixture in said gaps adapted to serve as a coupling means when under the influence of a magnetic field, magnetic shunt means for causing said magnetic field to bypass one of said gaps, and means to shift said shunt means to cause magnetic field to bypass the other of said gaps.

5. A magnetic fluid clutch-brake including a driving rotor, a driven rotor, and a stationary brake; said driven rotor comprising an axially polarized permanent magnetic field, a pole structure having portions overlying said permanent magnet and serving as a flux path for said magnetic field, and nonmagnetic spacers arranged in said pole structure to provide interruptions in said flux path, said driving rotor having a magnetic ring surrounding one of said nonmagnetic spacers and defining an air gap therewith, said brake comprising a magnetic ring surrounding a second of said nonmagnetic spacers and defining a second gap therewith, the magnetic ring of said driving rotor and of said brake serving to complete the flux path for said magnetic field, a magnetically susceptible mixture in said air gaps adapted to serve as a force transmitting means when under the influence of a magnetic field, and magnetic shunt means adapted to provide a flux path of low reluctance for said magnetic field bridging one of said nonmagnetic spacers for causing the magnetic field to bypass one of said gaps, said shunt means being movable whereby it may be positioned to bridge the second of said nonmagnetic spacers for causing said magnetic field to bypass the second of said gaps.

6. A magnetic fluid clutch-brake including a driven member, a driving member adjacent said driven member and spaced therefrom by a gap, a brake means adjacent one of said members and spaced therefrom by a second gap, said gaps containing a magnetically susceptible mixture, one of said members comprising magnetic means arranged to create a magnetic field in said gaps, and shunt means for preventing said magnetic field from being created in one of said gaps.

KARL M. FEIERTAG.

References Cited in the file of this patent

UNITED STATES PATENTS

| Number | Name | Date |
|---|---|---|
| 1,862,267 | Honig | June 7, 1932 |
| 2,544,360 | Schmidt | Mar. 6, 1951 |
| 2,591,463 | Parker | Apr. 1, 1952 |

FOREIGN PATENTS

| Number | Country | Date |
|---|---|---|
| 562,622 | Great Britain | 1944 |